(12) United States Patent
Leith

(10) Patent No.: US 9,346,454 B1
(45) Date of Patent: May 24, 2016

(54) REUSABLE CONCRETE FORM DEVICE

(76) Inventor: Tim M. Leith, Torquay (AU)

(*) Notice: Subject to any disclaimer, the term of this patent is extended or adjusted under 35 U.S.C. 154(b) by 36 days.

(21) Appl. No.: 13/275,818

(22) Filed: Oct. 18, 2011

(51) Int. Cl.
*E04G 11/08* (2006.01)
*E04G 11/36* (2006.01)
*B60W 10/107* (2012.01)

(52) U.S. Cl.
CPC .................................. *B60W 10/107* (2013.01)

(58) Field of Classification Search
USPC .................. 249/2, 3, 4, 5, 6, 7, 8, 34
See application file for complete search history.

(56) References Cited

U.S. PATENT DOCUMENTS

| | | | | | |
|---|---|---|---|---|---|
| 1,495,305 | A | * | 5/1924 | Heltzel | 249/6 |
| 1,496,933 | A | * | 6/1924 | Heltzel | 249/4 |
| 1,523,961 | A | * | 1/1925 | Heltzel | 249/6 |
| 1,561,923 | A | * | 11/1925 | Heltzel | 249/6 |
| 2,661,517 | A | * | 12/1953 | Findley | 249/34 |
| 2,845,683 | A | * | 8/1958 | Winegar | 249/5 |
| 3,288,426 | A | * | 11/1966 | Simpson | 249/192 |
| 3,785,606 | A | * | 1/1974 | Green | 249/3 |
| 4,066,237 | A | * | 1/1978 | Bentz | 249/213 |
| 4,884,382 | A | | 12/1989 | Horobin | |
| 5,086,600 | A | | 2/1992 | Holland et al. | |
| 5,570,552 | A | | 11/1996 | Nehring | |
| 6,536,737 | B1 | * | 3/2003 | Davis | 249/3 |
| 6,922,962 | B2 | | 8/2005 | Schmidt | |
| 2009/0272873 | A1 | * | 11/2009 | Fittler et al. | 249/3 |

* cited by examiner

*Primary Examiner* — Michael Safavi
(74) *Attorney, Agent, or Firm* — Crossley Patent Law

(57) ABSTRACT

The reusable concrete form device especially provides for extreme portability due to light weight, easily assembled components, and tools used repetitively in the application of the forms, flexible forms, braces, and pegs of the device. The device further provides for exact positioning and for maintaining that positioning until desired removal. The sliding dovetail joints of the forms and braces provide this feature. The pegs are located into a surface such as ground, then selectively locked in position relative to each brace via pivot head lock screws disposed within each brace. The headed pegs removably pass through chambers within the braces and are locked in position via pivot headed lock screws. Concrete poured is thereby poured exactly as needed. Joiners with tails are used to also form sliding dovetail joints and to joint forms and flexible forms together.

12 Claims, 7 Drawing Sheets

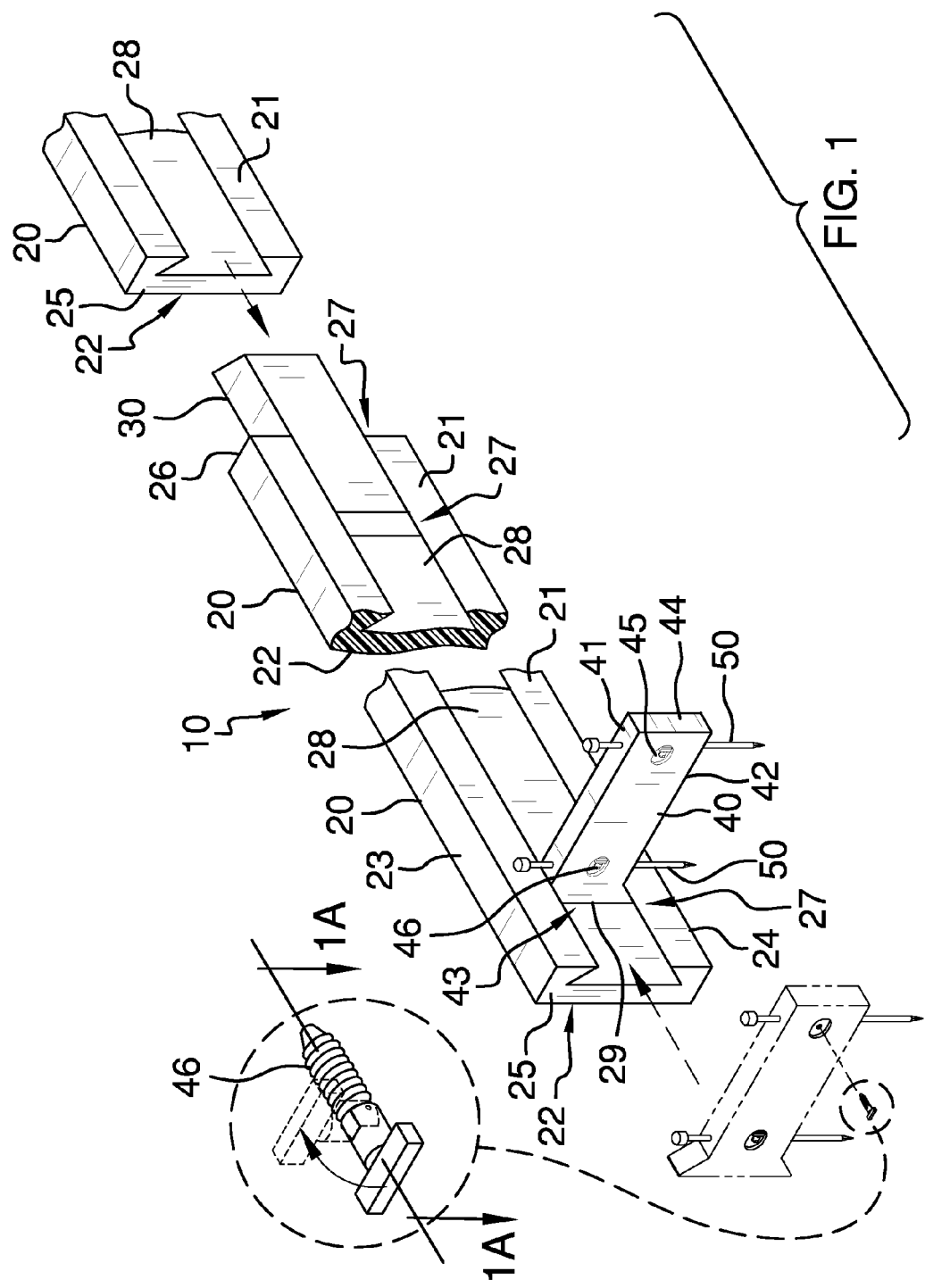

REUSABLE CONCRETE FORM DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Concrete forms are widely used and are often constructed from "scratch" on site of construction. And, some portable, reusable concrete forms have been in use. Of the forms in use, none provide the features of the present device.

FIELD OF THE INVENTION

The reusable concrete form device relates to concrete forms and more especially to a highly portable, reusable concrete form device.

SUMMARY OF THE INVENTION

The general purpose of the reusable concrete form device, described subsequently in greater detail, is to provide a reusable concrete form device which has many novel features that result in an improved reusable concrete form device which is not anticipated, rendered obvious, suggested, or even implied by prior art, either alone or in combination thereof.

To attain this, the reusable concrete form device especially provides for extreme portability due to light weight, easily assembled components, and tools used repetitively in the application of the forms, braces, and pegs of the device. The device further provides for exact positioning and for maintaining that positioning until desired removal. The sliding dovetail joints of the forms and braces provide this feature. The pegs are located into a surface such as ground, then selectively locked in position relative to each brace via pivot head lock screws disposed within each brace. The headed pegs removably pass through chambers within the braces and are locked in position via pivot headed lock screws. Concrete poured is thereby poured exactly as needed. Joiners with tails are used to also form sliding dovetail joints and to joint forms together.

The forms are be made of various materials that ensure light weight, such as plasticized materials, recycled plasticized materials, various polymers, composites that are all far superior to wood and the like. The materials used in the present device not only provide light weight but also provide for easy concrete release after pouring, a very important feature.

The device may also comprise flexible forms. Each flexible form resembles the other forms but includes features of the braces such that braces are not needed with the flexible forms. A socket is disposed within the flexible form on the first side and may or may not extend from the first end to the second end. The joiners may be used to join flexible forms to each other and also to other forms. The flexible forms may provide a plurality of spaced apart chambers. A pivot head lock screw is removably and adjustably disposed within each chamber. A plurality of headed pegs is removably passed through each flexible form from the flexible form top through the flexible form bottom, one of each headed peg is passed through one of each of the chambers, respectively, each headed peg selectively locked to each flexible form via the pivot headed lock screws, each headed peg configured to pass into a surface for anchoring the flexible forms. Once engaged with the headed pegs, each pivot headed lock screw may be pivoted to be entirely contained with each of the chambers.

The tools optionally provided as part of the device also offer needed advantages. The peg remover enables a single user to pull the headed pegs used in locating the braces and the flexible forms. As the headed pegs may be quite large and sunk deeply into a surface such as ground, this featured component of the device is important.

Thus has been broadly outlined the more important features of the improved reusable concrete form device so that the detailed description thereof that follows may be better understood and in order that the present contribution to the art may be better appreciated.

An object of the reusable concrete form device is to provide a reusable concrete form device.

Another object of the reusable concrete form device is to provide an easily portable concrete form device.

Another object of the reusable concrete form device is to provide a lightweight concrete form device.

A further object of the reusable concrete form device is to accommodate most needs in pouring concrete forms for foundations, borders, curbs, and the like.

An added object of the reusable concrete form device is to provide a sturdy concrete form device that retains exact positioning for concrete pours.

And, an object of the reusable concrete form device is to provide an easily installed concrete form device.

An object of the reusable concrete form device is to provide an easily removed concrete form device.

These together with additional objects, features and advantages of the improved reusable concrete form device will be readily apparent to those of ordinary skill in the art upon reading the following detailed description of presently preferred, but nonetheless illustrative, embodiments of the improved reusable concrete form device when taken in conjunction with the accompanying drawings.

BRIEF DESCRIPTION OF THE DRAWINGS

FIG. 1 is a first side perspective view of forms, brace, and joiner with tail

DETAILED DESCRIPTION OF THE DRAWINGS

Figure 1A:
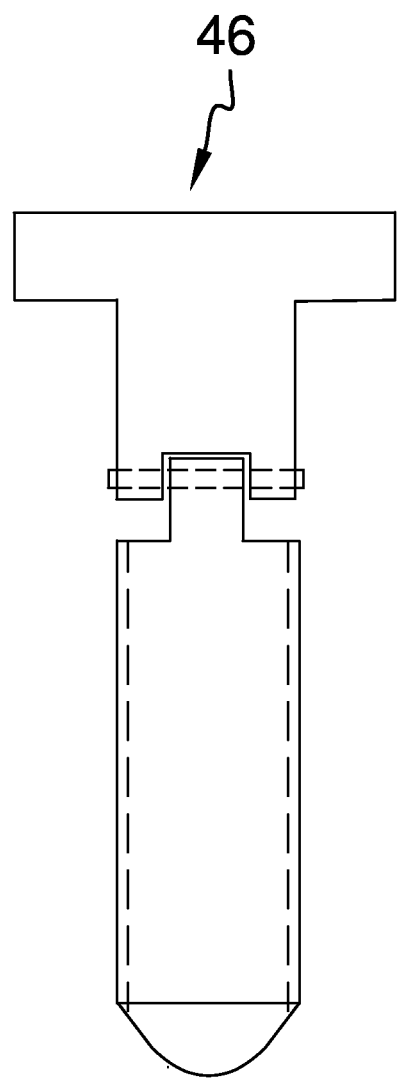
FIG. 1A is a top plan view of a pivot head lock screw.

With reference now to the drawings, and in particular FIGS. 1 through 6 thereof, the principles and concepts of the reusable concrete form device generally designated by the reference number 10 will be described.

Referring to FIG. 1, the device 10 partially comprises a plurality of forms 20. Each form 20 has a first side 21 spaced apart from a second side 22, a top 23 spaced apart from a bottom 24, and a first end 25 spaced apart from a second end 26. A socket 28 is disposed within the first side 21 from the first end 25 to the second end 26.

Figure 2:
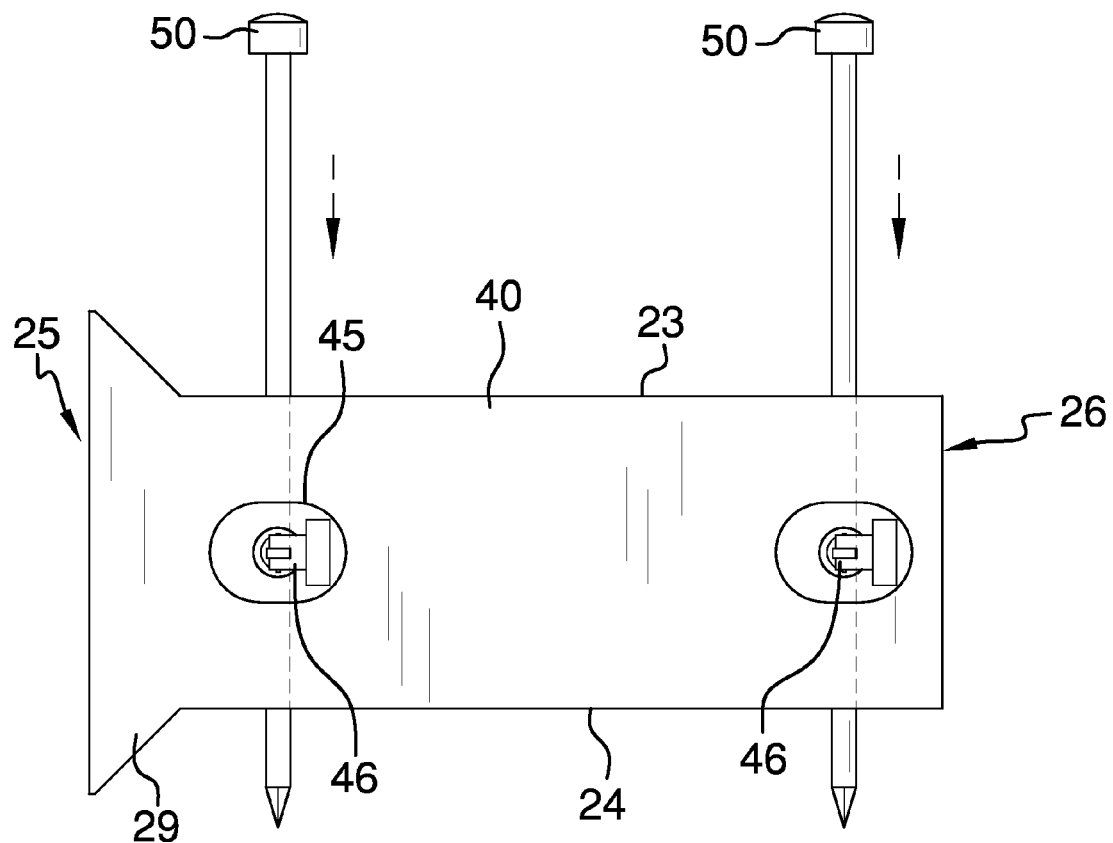
FIG. 2 is a lateral elevation view of a brace.

Referring to FIG. 2, a plurality of braces 40 is provided. Each brace 40 has a brace top 41 spaced apart from a brace bottom 42 and a brace first end 43 spaced apart from a brace second end 44. A tail 29 is disposed on the brace first end 43.

Referring again to FIG. 1, the form 20 sockets 28 and the brace 40 tails 29 form a plurality of sliding dovetail joints 27. A plurality of joiners with tails 30 is provided. One of each joiner with tail 30 is removably inserted into one of the form 20 first ends 25 and into the second end 26 of another form 20 to removably join the forms 20.

Referring again to FIG. 2, a plurality of chambers 45 is disposed within each brace 40.

Referring to FIG. 1A and again to FIG. 2, a pivot head lock screw 46 is removably and adjustably disposed within each chamber 45.

Figure 3:
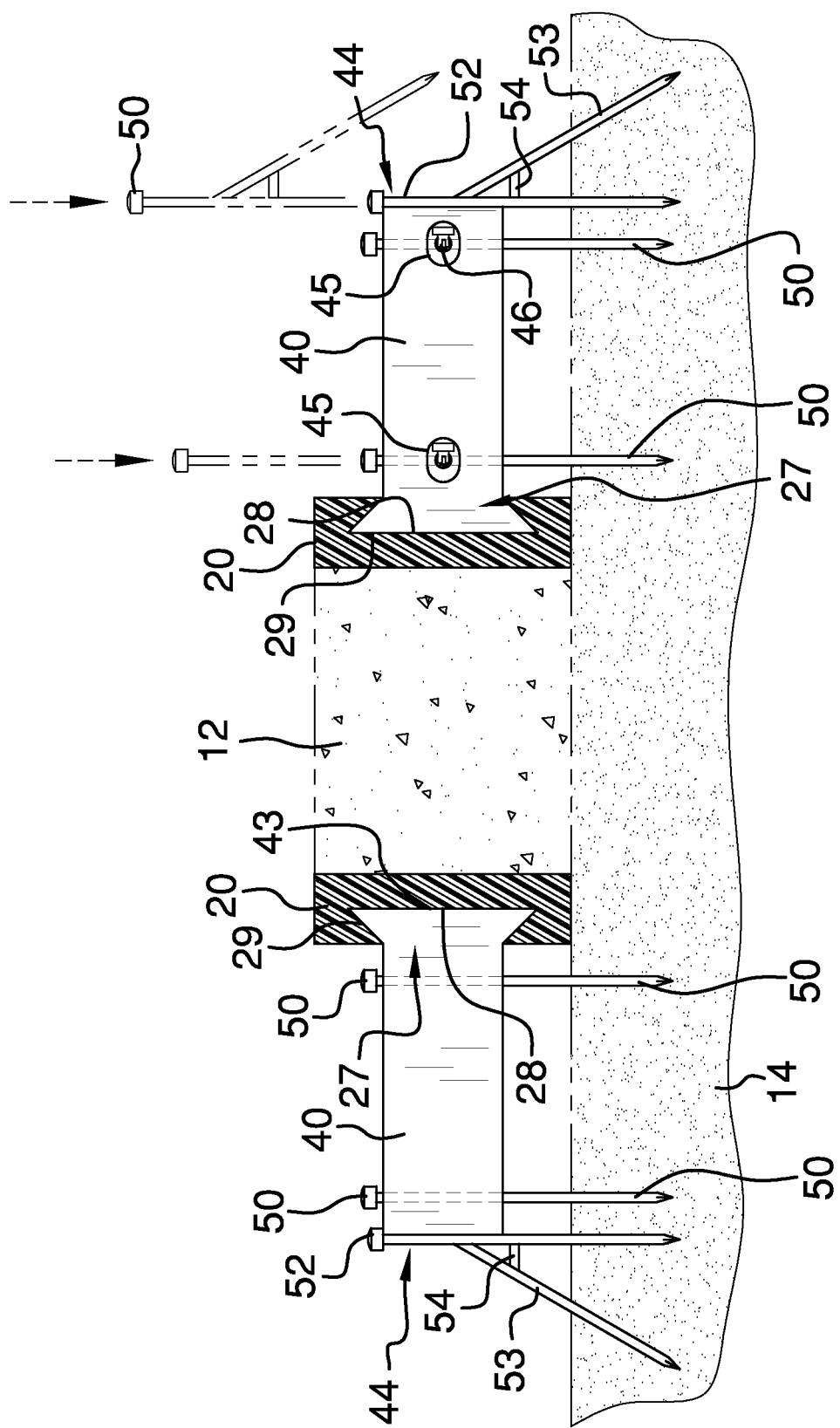
FIG. 3 is an in-use view of the forms and braces.

Referring to FIG. 3, a plurality of headed pegs 50 is removably passed through each brace 40 from the brace top 41 through the brace bottom 42. One of each headed peg 50 is passed through one of each of the chambers 45, respectively. Each headed peg 50 is selectively locked to each brace via one of the pivot headed lock screws 46. Each headed peg 50 is configured to pass into a surface 14 for anchoring the braces 40.

Referring again to FIG. 3, a plurality of stabilizer pegs 52 is provided. Each stabilized peg 52 further comprises an angled peg 53 angularly disposed outwardly and downwardly and a stabilizer 54 connecting the angled peg 53 to the stabilizer peg 52.

Figure 4:
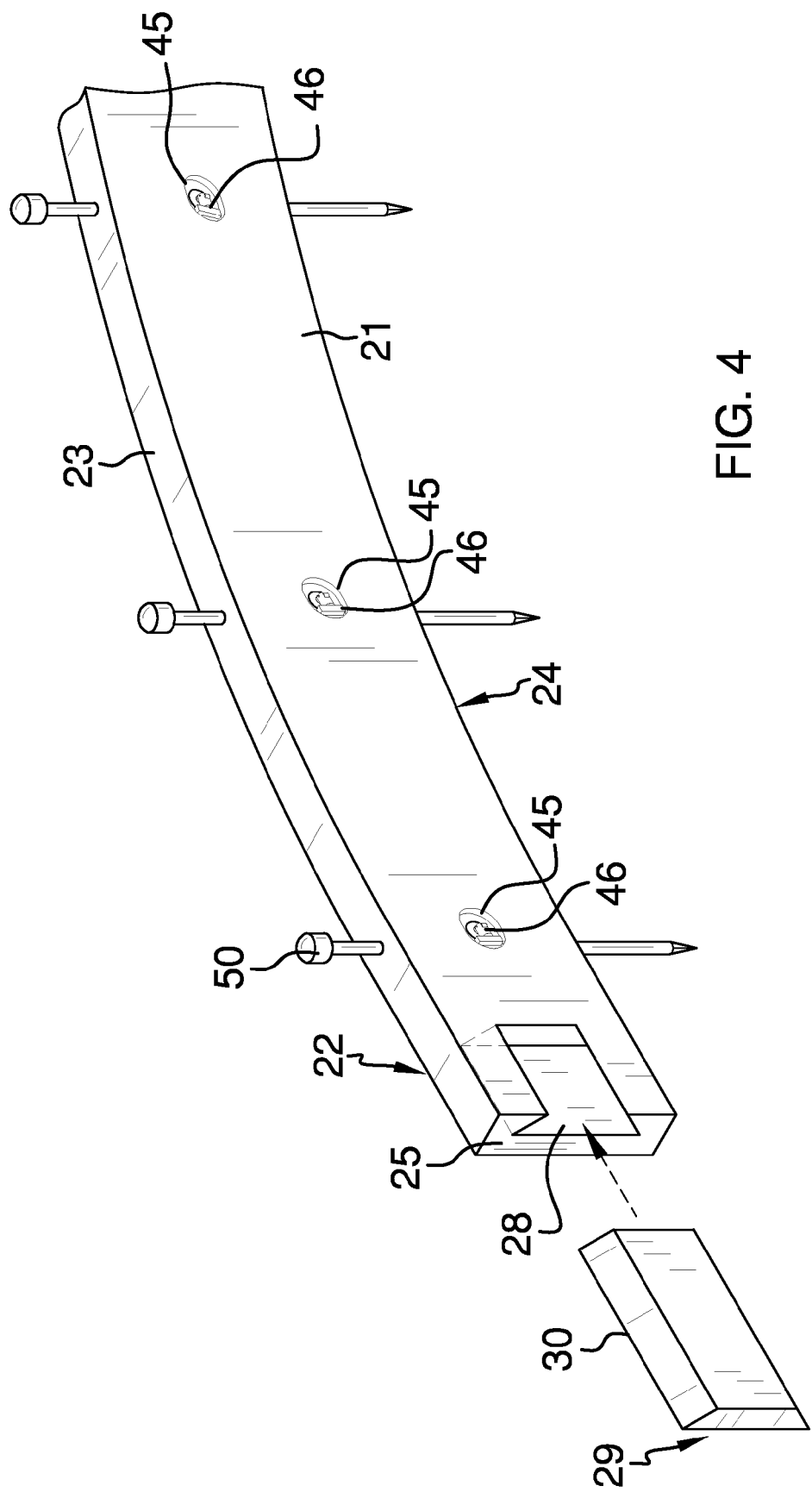
FIG. 4 is a perspective view of the flex form and a joiner.

Referring to FIG. 4, the device 10 may further comprise a plurality of flexible forms 20A. Each flexible form 20A has a first side 21 spaced apart from a second side 22, a top 23 spaced apart from a bottom 24, and a first end 25 spaced apart from a second end 26. Like the forms 20, a socket 28 is disposed within the first side 21 from the first end 25 to the second end 26. The joiners with tails are used to connect the flexible forms 20A with each other and with forms 20.

Continuing to refer to FIG. 4 and referring also to FIG. 1, one of each joiner with tail 30 is configured to be removably and optionally inserted into one of the flexible form 20A sockets 28 and also into a form 20 socket 28. The forms 20 and the flexible forms 20A are thereby removably and optionally joined. A plurality of spaced apart chambers 45 is disposed within each flexible form 20A. One pivot head lock screw 46 is removably and adjustably disposed within each chamber 45. A plurality of headed pegs 50 is removably passed through each flexible form 20A from the flexible form 20A top 23 through the flexible form 20A bottom 24. One of each headed peg 50 is passed through one of each of the chambers 45, respectively. One of each of the headed pegs 50 is selectively locked to each flexible form 20A via one of each of the pivot headed lock screws 46. Each headed peg 50 is configured to pass into an existing surface 14 for anchoring the flexible forms 20A.

Referring again to FIG. 3, concrete 12 is poured between the forms 20 and allowed to at least partially cure. The forms 20 and also forms 20A are removed as chosen.

Figure 5:
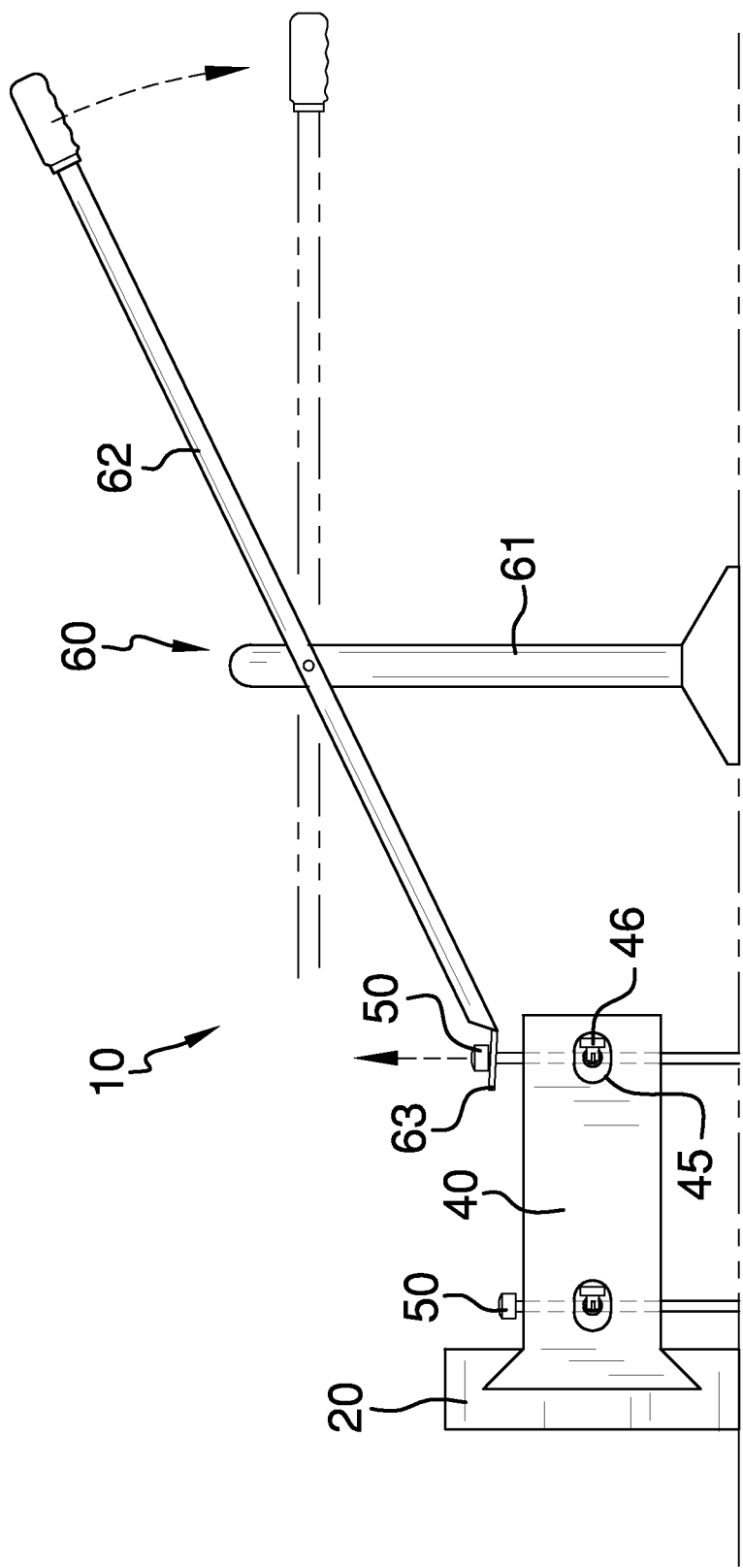
FIG. 5 is a lateral elevation view of a form with braces installed and the peg remover in use.

Referring to FIG. 5, a peg remover 60 is provided. The peg remover 60 partially comprises a wide base stanchion 61. A pivoted bar 62 is disposed upwardly on the wide based stanchion 61. A flat slotted head 63 is disposed at a one end of the pivoted bar 62. The flat slotted head 63 is configured to pry the headed pegs 50 and the stabilizer pegs 52 out of the surface 14.

Figure 6:
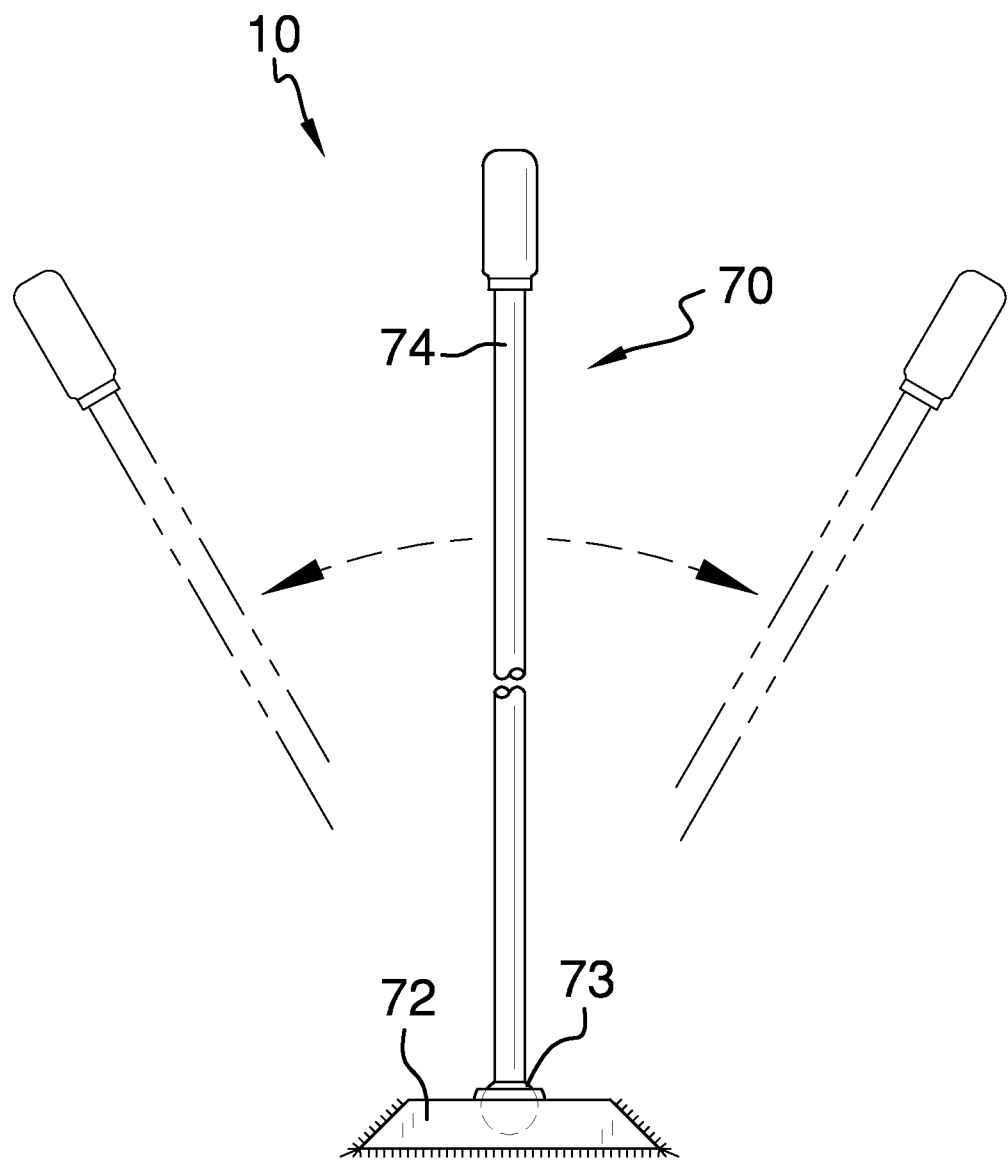
FIG. 6 is a lateral elevation view of the socket cleaner.

Referring to FIG. 6, the device 10 further comprises a socket cleaner 70. The socket cleaner 70 further comprises a bristled tail 72 configured to slideably pass through the forms 20 and flexible forms 20A sockets 28, for cleaning. A ball socket 73 is disposed atop the bristled tail 72. A handle 74 is pivotally disposed within the ball socket 73. The socket cleaner 70 can thereby be handily and easily used from a variety of angles and directions to clean the sockets 28 of the forms 20 and flexible forms 20A.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the reusable concrete form device may be used.

What is claimed is:

1. A reusable concrete form device comprising, in combination:
   a plurality of forms, each form having a first side spaced apart from a second side, a top spaced apart from a bottom, and a first end spaced apart from a second end;
   a socket disposed within the first side from the first end to the second end;
   a plurality of braces, each brace having a brace top spaced apart from a brace bottom and a brace first end spaced apart from a brace second end;
   a tail disposed on the brace first end, the form sockets and the brace tails forming a plurality of sliding dovetail joints;
   a plurality of chambers disposed within each brace;
   a pivot head lock screw removably and adjustably disposed within each chamber;
   a plurality of headed pegs removably passed through each brace from the brace top through the brace bottom, one of each headed peg passed through one of each of the chambers, respectively, each headed peg selectively locked to each brace via one of the pivot headed lock screws, each headed peg configured to pass into a surface for anchoring the braces;
   a plurality of stabilizer pegs, each stabilized peg further comprising an angled peg angularly disposed outwardly and downwardly and a stabilizer connecting the angled peg to the stabilizer peg.

2. The device according to claim 1 further comprising a peg remover, the peg remover comprising:
   a wide base stanchion;
   a pivoted bar disposed upwardly on the wide based stanchion;
   a flat slotted head disposed at a one end of the pivoted bar, the flat slotted head configured to pry the headed pegs and the stabilizer pegs out of the surface.

3. The device according to claim 1 further comprising a socket cleaner, the socket cleaner further comprising:
   a bristled tail configured to slideably pass through the form sockets;
   a ball socket disposed atop the bristled tail;
   a handle pivotally disposed within the ball socket.

4. The device according to claim 2 further comprising a socket cleaner, the socket cleaner further comprising:
   a bristled tail configured to slideably pass through the form sockets;
   a ball socket disposed atop the bristled tail;
   a handle pivotally disposed within the ball socket.

5. A reusable concrete form device comprising, in combination:

a plurality of forms, each form having a first side spaced apart from a second side, a top spaced apart from a bottom, and a first end spaced apart from a second end;

a socket disposed within the first side from the first end to the second end;

a plurality of braces, each brace having a brace top spaced apart from a brace bottom and a brace first end spaced apart from a brace second end;

a tail disposed on the brace first end, the form sockets and the brace tails forming a plurality of sliding dovetail joints;

a plurality of joiners with tails, one of each joiner with tail removably inserted into one of the form first ends and into one of the second ends of another form, the forms thereby removably joined;

a plurality of chambers disposed within each brace;

a pivot head lock screw removably and adjustably disposed within each chamber;

a plurality of headed pegs removably passed through each brace from the brace top through the brace bottom, one of each headed peg passed through one of each of the chambers, respectively, one of each of the headed pegs selectively locked to one of each of the braces via one of each of the pivot headed lock screws, each headed peg configured to pass into a surface for anchoring the braces;

a plurality of stabilizer pegs, each stabilized peg further comprising an angled peg angularly disposed outwardly and a stabilizer connecting the angled peg to the stabilizer peg.

6. The device according to claim 5 further comprising a plurality of flexible forms, each flexible form having a first side spaced apart from a second side, a top spaced apart from a bottom, and a first end spaced apart from a second end;

a socket disposed within the first side from the first end to the second end, the flexible form sockets removably and slideably joined with sockets of forms and sockets of flexible forms via the joiners with tails;

a plurality of spaced apart chambers disposed within each flexible form, one pivot head lock screw removably and adjustably disposed within each chamber;

a plurality of the headed pegs removably passed through each flexible form from the flexible form top through the flexible form bottom, one of each headed peg passed through one of each of the chambers, respectively, each headed peg selectively locked to each flexible form via one of the pivot headed lock screws, each headed peg configured to pass into the surface for anchoring the flexible forms.

7. The device according to claim 5 further comprising a peg remover, the peg remover comprising;

a wide base stanchion;

a pivoted bar disposed upwardly on the wide based stanchion;

a flat slotted head disposed at a one end of the pivoted bar, the flat slotted head configured to pry the headed pegs and the stabilizer pegs out of the surface.

8. The device according to claim 6 further comprising a peg remover, the peg remover comprising;

a wide base stanchion;

a pivoted bar disposed upwardly on the wide based stanchion;

a flat slotted head disposed at a one end of the pivoted bar, the flat slotted head configured to pry the headed pegs and the stabilizer pegs out of the surface.

9. The device according to claim 5 further comprising a socket cleaner, the socket cleaner further comprising:

a bristled tail configured to slideably pass through the form sockets;

a ball socket disposed atop the bristled tail;

a handle pivotally disposed within the ball socket.

10. The device according to claim 6 further comprising a socket cleaner, the socket cleaner further comprising:

a bristled tail configured to slideably pass through the form sockets;

a ball socket disposed atop the bristled tail;

a handle pivotally disposed within the ball socket.

11. The device according to claim 7 further comprising a socket cleaner, the socket cleaner further comprising:

a bristled tail configured to slideably pass through the form sockets;

a ball socket disposed atop the bristled tail;

a handle pivotally disposed within the ball socket.

12. The device according to claim 8 further comprising a socket cleaner, the socket cleaner further comprising:

a bristled tail configured to slideably pass through the form sockets;

a ball socket disposed atop the bristled tail;

a handle pivotally disposed within the ball socket.

* * * * *